United States Patent [19]

Burnham et al.

[11] 3,938,130

[45] Feb. 10, 1976

[54] DIRECTION CODED DIGITAL STROKE GENERATOR PROVIDING A PLURALITY OF SYMBOLS

[75] Inventors: Gerald O. Burnham, Los Angeles; John W. Weber, Inglewood, both of Calif.

[73] Assignee: Hughes Aircraft Company, Culver City, Calif.

[22] Filed: Aug. 6, 1973

[21] Appl. No.: 385,919

Related U.S. Application Data

[63] Continuation of Ser. No. 229,231, Feb. 25, 1972, abandoned.

[52] U.S. Cl. .............................. 340/324 A; 235/198

[51] Int. Cl.[2] .............................. G06F 3/14

[58] Field of Search .................. 340/324 A; 235/198

[56] References Cited

UNITED STATES PATENTS

| | | | |
|---|---|---|---|
| 3,510,865 | 5/1970 | Callahan et al. | 340/324 A |
| 3,597,757 | 8/1971 | Vincent-Carrefour et al. | 340/324 A |
| 3,691,551 | 9/1972 | Kashio | 340/324 A |

*Primary Examiner*—Marshall M. Curtis

*Attorney, Agent, or Firm*—W. H. MacAllister; Walter J. Adam

[57] ABSTRACT

A direction coded digital stroke generator that allows arbitrary symbols to be defined in real time and in which these symbols consist of substantially an unlimited number of discrete segments. When interfaced with a memory source such as a digital computer the stroke generator provides highly flexible symbol generation capability at a relatively low cost in terms of memory requirements and with a relatively high writing speed. Each line segment is defined by four binary bits with three bits defining direction and one bit determining blanking. The three direction bits are decoded to control X and Y up/down counters orienting the segment in one of eight directions. A selectable segment length feature is provided allowing development of segments of selected lengths so that the symbols have a selected size and degree of detail.

2 Claims, 13 Drawing Figures

Symbol Last Word
392
Computer Last Word
390
Request Received
352
Data Available from Computer
356
$\overline{D_{xy}}$
Data Strobe
360
Symbol Start
362
Symbol Gen. Size 3 Clock
368
$S_0$
370
$S_1$
371
$S_2$
372
$S_3$
373
$S_4$
374
$S_5$
375
$S_6$
376
$S_7$
377
Word Complete
380
$D_{xy}$
386
$\overline{D_{xy}}$
388
$PB_{90}$
351
Data Strobe Dxy
358
Data Strobe Dxy Delay
387
Word Req. Strobe
389
Word Req.
350

DIRECTION CODED DIGITAL STROKE GENERATOR PROVIDING A PLURALITY OF SYMBOLS

This is a continuation, of application Ser. No. 229,231, filed Feb. 23, 1972, now abandoned.

BACKGROUND OF THE INVENTION

1. Field of the Invention

This invention relates to display systems using symbol generators and particularly to a display system having a direction coded incremental digital stroke generator.

2. Description of the Prior Art

Conventional digital stroke generators for providing symbols such as upon the face of a cathode ray tube, utilize a fixed set of hard wired symbol controls that are generated within a limited set of rigid formats and from which individual symbols are selectable. These generators having hard wired symbol controls may be operated with a substantially small memory when generating simple characters such as letters of the alphabet. However, when generating complicated symbols or pictures such as geographic maps showing coastlines, lakes and mountains, the amount of memory required using the hard wired symbol technique is so excessive as to be impractical. Another problem with a stroke generator using fixed wiring for generating symbols is that it lacks flexibility since only characters that have a limited number of variations may be formed. Other problems of digital stroke generators using hard wired symbol techniques is that the hardward is substantially complex, and the symbol length is fixed for each symbol, and the memory must be static so that new display characters and features cannot be generated in real time.

SUMMARY OF THE INVENTION

Briefly, the direction coded digital stroke generator in accordance with the invention defines symbols by sequence of short-line segments concatenated or linked together in a series to form the complete symbol. Each line segment is defined by four binary bits with three bits being utilized to define direction and one bit being utilized to determine segment blanking. The three direction bits are decoded to control X and Y up/down counters orienting the segment from its existing position in one of eight directions. Once an initial point is established for drawing a symbol, the segments of the symbol which are of a fixed length only vary in direction and it is not required to specify the initial starting point of each segment or to specify its magnitude. Another feature of the stroke generator in accordance with the invention is that desired segment lengths may be selected for writing symbols of different sizes and of different levels of detail.

It is therefore an object of this invention to provide an improved stroke generator operating with a minimum of hardware and having a substantial flexibility of symbol generation capability.

It is another object of this invention to provide a digital stroke generator that utilizes segments so as to be independent of fixed symbol formats.

It is another object of this invention to provide an improved digital stroke generator that operates to develop complex display patterns and symbols while only requiring a minimum of memory capacity.

It is a further object of this invention to provide an improved digital display system that is capable of varying the display and the symbols in real time by changing the memory contents.

It is a still further object of this invention to provide a highly flexible symbol generator system in which symbol size may be selected.

BRIEF DESCRIPTION OF THE DRAWINGS

These and other objects, features and advantages of the invention itself will become apparent to those skilled in the art in the light of the following detailed description taken in consideration with the accompanying drawings wherein like reference numerals indicate like or corresponding parts throughout the several parts.

DETAILED DESCRIPTION OF THE INVENTION

Figure 1:
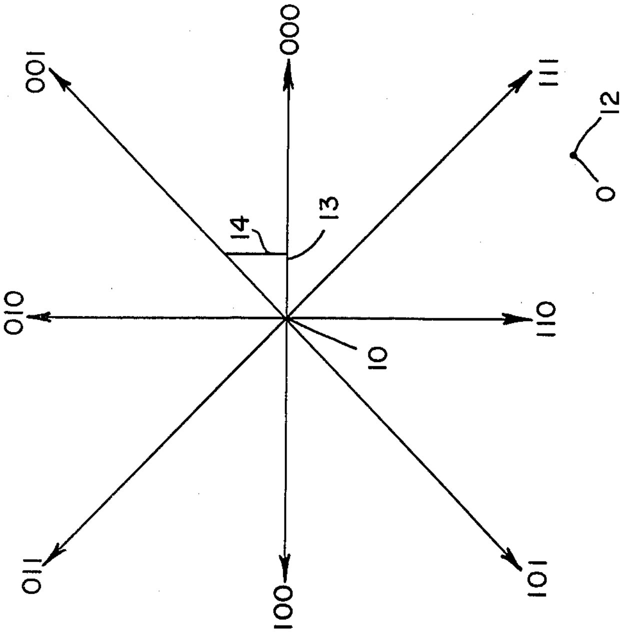
FIG. 1 is a schematic diagram showing the segment directions that are coded in the digital stroke generator in accordance with the invention.

Referring first to FIG. 1, symbols in the system of the invention are defined by a sequence of short line segments with three bits from a memory source being utilized to define the direction of each segment. The decoding scheme of these three direction bits $B_0$, $B_1$ and $B_2$ is as follows for controlling X and Y up/down counters (respectively controlling X and Y deflection on a display surface) which provide the orientation of the segments in one of eight directions.

| Direction $B_0$ | $B_1$ | $B_2$ | Counter X | Counter Y |
|---|---|---|---|---|
| 0 | 0 | 0 | Up | Stop |
| 0 | 0 | 1 | Up | Up |
| 0 | 1 | 0 | Stop | Up |
| 0 | 1 | 1 | Down | Up |
| 1 | 0 | 0 | Down | Stop |
| 1 | 0 | 1 | Down | Down |
| 1 | 1 | 0 | Stop | Down |
| 1 | 1 | 1 | Up | Down |

Each of the codes $B_0$, $B_1$, $B_2$ define a direction as indicated in FIG. 1 with adjacent directions being at an angle of 45° from each other. The direction is always defined from a point 10 which may be a substantial distance or count from an origin or zero position 12. For example, if the count is 500 at the point 10 in both the X and the Y counters, a count up of both the X counter and the Y counter of one increment establishes the direction along the 001 segment. Lines 13 and 14 comprise X and Y components respectively of the 001 deflection signal. A count down on the X counter and a count up in the Y counter establishes the 011 direction and an X stop and a count down in the Y counter establishes the direction 110, for example. The system utilizes eight directions to each of eight adjacent grid points, thus allowing symbols to be generated within an X and Y coordinate system. Thus, the diagonal segments 001, 111, 101 and 011 are longer than the other four segments so that the end of the segments in the figure of FIG. 1 form a square, but this type of grid segments has been found to form highly satisfactory symbols and pictures.

Figure 2:
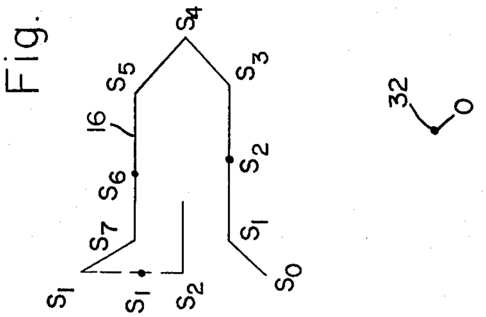
FIG. 2 is an illustrative example of a symbol to be drawn for explaining the operation of the system of the invention.
Figure 3:
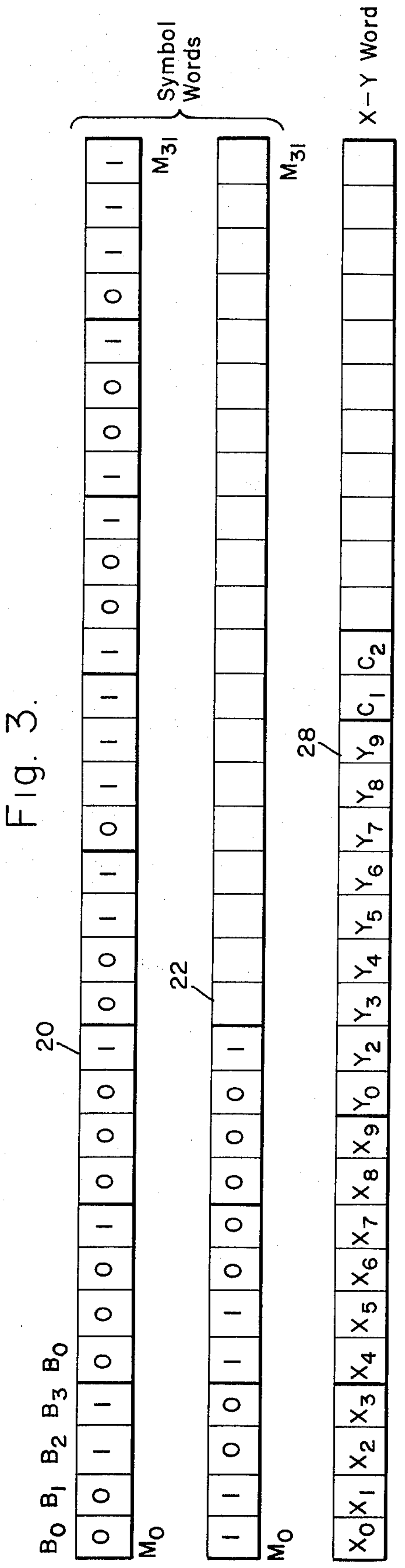
FIG. 3 is a schematic diagram of symbol words and of an XY word for explaining the operation of the system of the invention.

Referring now to FIGS. 2 and 3, an illustrative symbol 16 is shown drawn on the display surface and representing for example, an aircraft or a target in flight. For drawing the symbol 16, the segment definition sequence of 32-bit symbol words 20 and 22 is utilized. It is to be noted that in the illustrated system 32-bit words are used and for certain symbols, additional words or portions of words may be required. Each word such as 20 or 22 defines in a sequential or chain fashion, eight segments indicated as starting points $S_0$ to $S_7$ with the symbol 16 requiring three additional sequential segments $S_0$, $S_1$, $S_2$ following the first word 20, with the segments $S_0$ and $S_1$ being blanked by the $B_3$ bits being zeros. Thus the segments are formed in a sequential or chain fashion in response to the time sequence of words utilized or received from the stored symbol words such as 20 and 22. For the symbol 16, the segments are drawn in a time sequence to provide a chain of segments by sequentially using the commands 0011, 0001, 0001, 0111, 1001, 1001, 0111, 1100, 1100 and 0001 of the symbol words 20 and 22. For defining an initial position of a symbol such as 16 at the point 26, an XY word 28 may be utilized to deflect or position the beam of a cathode ray tube from a zero or origin point 32. In the illustrated system the XY starting positions of a symbol are each defined by a command of 10 bits $X_0$ to $X_9$ and $Y_0$ to $Y_9$. Also provided in the XY word 28 are bits $C_1$ and $C_2$ which provide selection of segment lengths in the symbols generated by the system of the invention. It is to be noted that the word length and word storage format may be selected so that substantially all bit positions of the words may be utilized in a system.

Figure 4A:
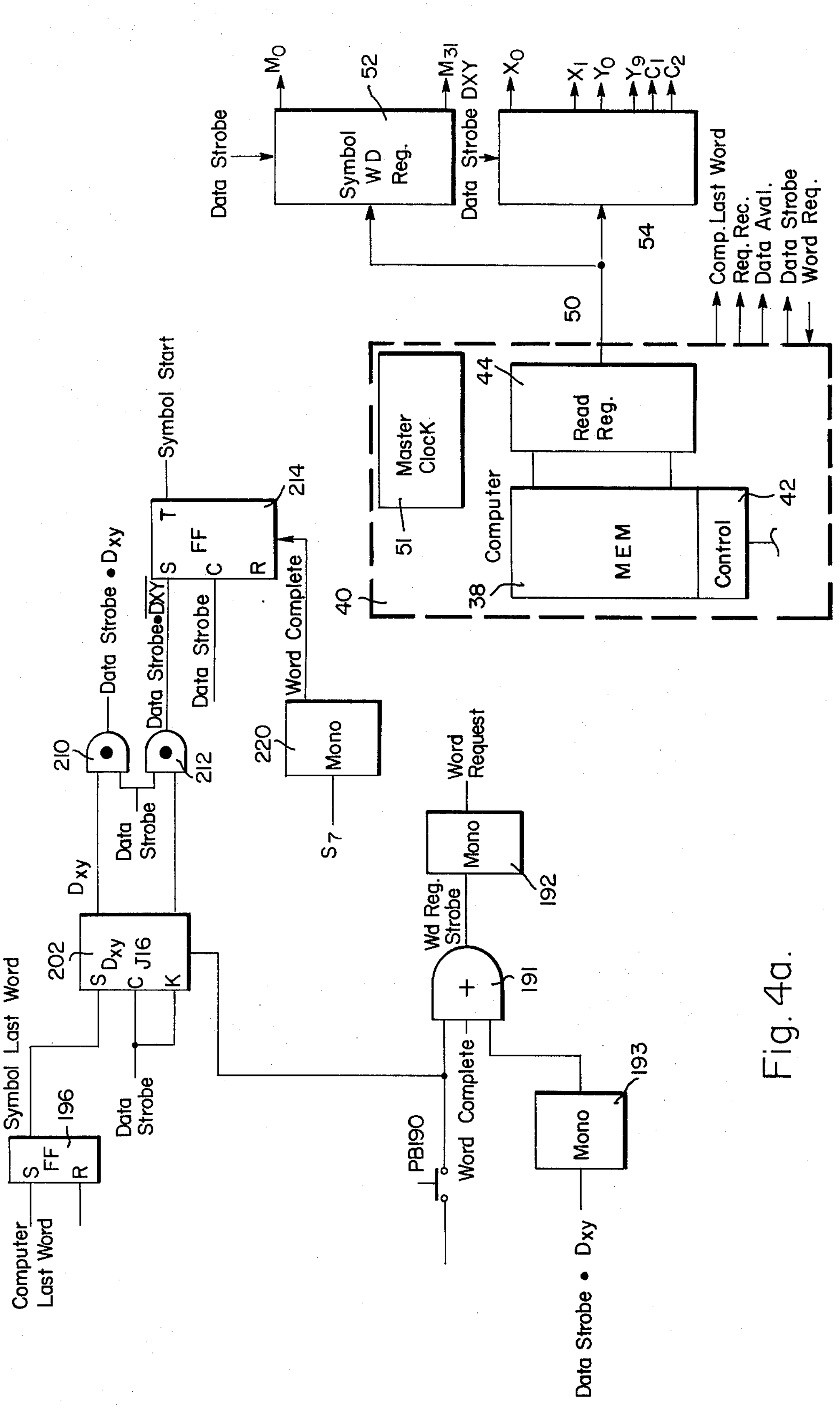
FIGS. 4*a*, 4*b* and 4*c* are schematic block and circuit diagrams of the digital display system in accordance with the invention.
Figure 4B:
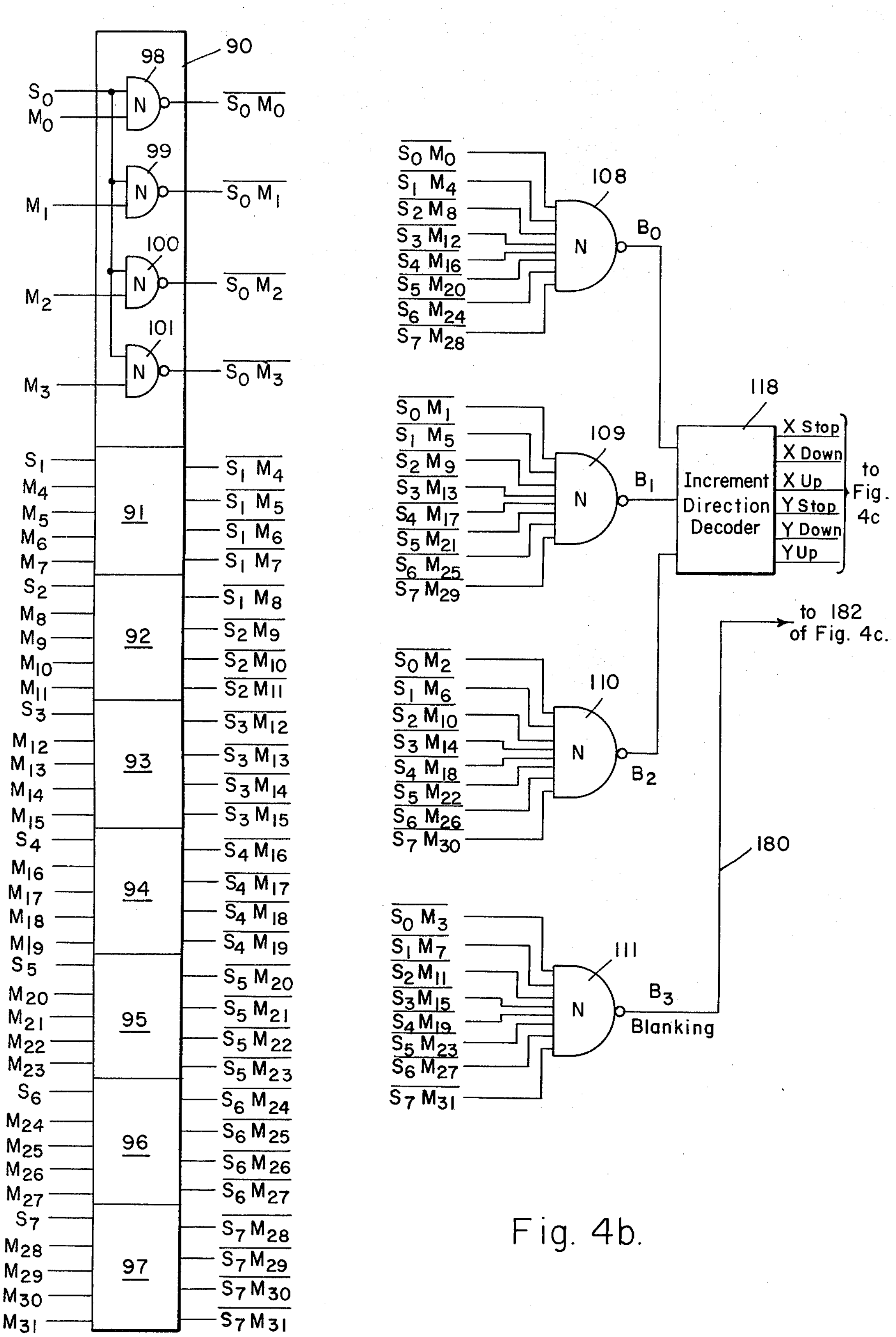
Figure 4C:
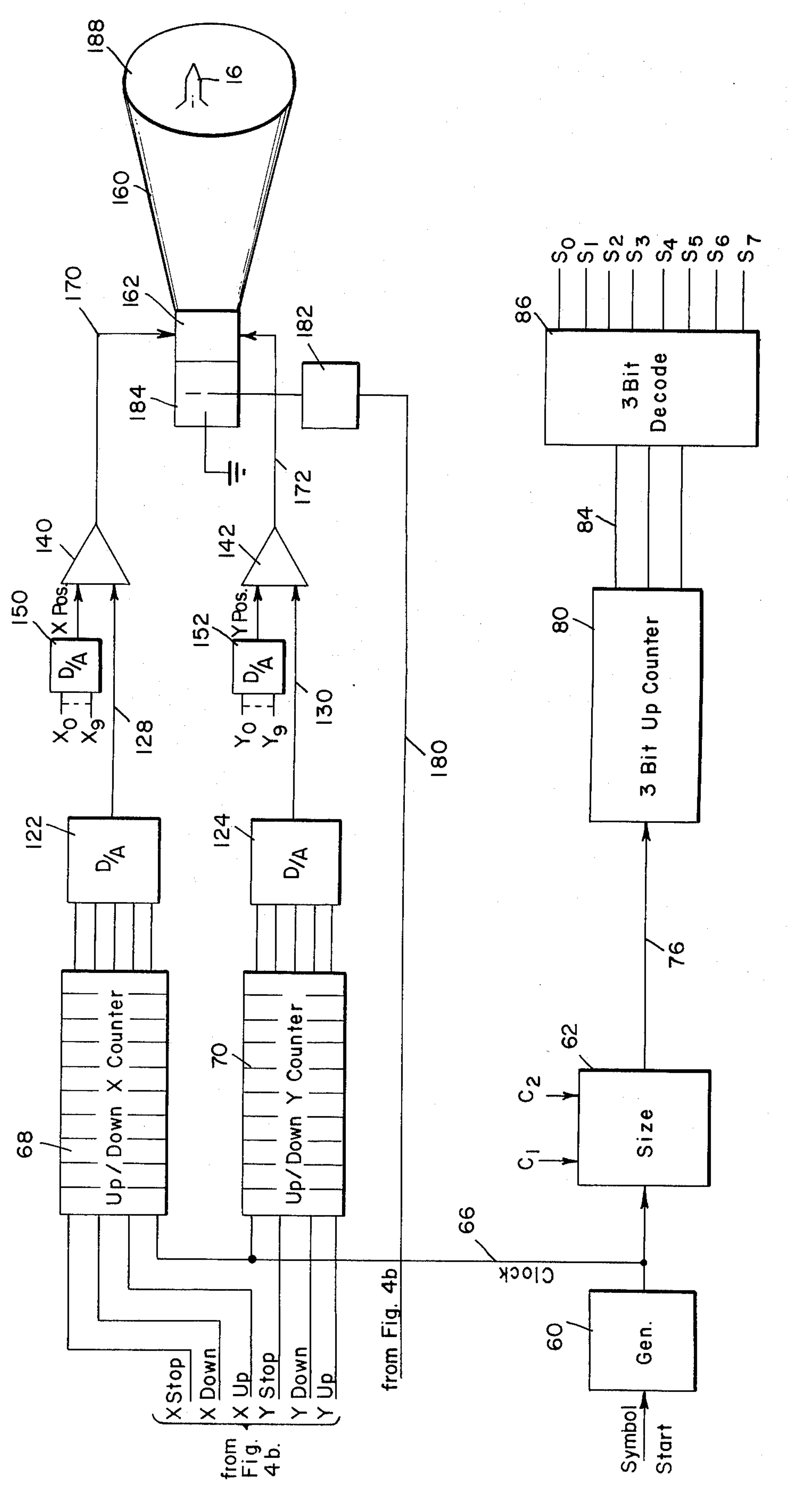

Referring now to the circuit and block diagram of FIGS. 4*a*, 4*b* and 4*c*, the digital stroke generator and display system in accordance with the invention is operable from any suitable data source such as a memory 38 which may be included in a computer 40 and which may have a control source 42 and a read register 44, as is well known in the art. A suitable input-output interface unit or mechanization (not shown) may be included as is required. It is to be understood that the principles of the invention are not to be limited to any particular type of data source but that any suitable storage or data generating unit either analog or digital may be utilized within the scope of the invention. The contents of the read register which may be either symbol words or XY words are applied through a composite lead 50 to a symbol word register 52 or to an XY word register 54, each of which in the illustrated system may include 32 binary storage elements or flip flops. The register 52 provides symbol word bits $M_0$ to $M_{31}$ and the register 54 provides X-Y word bits $X_0$ to $X_9$, $Y_0$ to $Y_9$ and $C_1$ and $C_2$. The memory 38 may operate in response to a master clock 51 with the core memory, for example, utilizing a conventional 4-clock read-write cycle. Thus in response to a work request pulse the memory cycle may be initiated to read the contents of the next word of an addressed sequence. The fourth clock may be utilized to develop a data available pulse and a data strobe pulse. In response to the word request pulse the computer may respond with a request received pulse as is well known in the art. A computer last word pulse may be developed from a decremented count in an input-output section of the computer, for example, or may be stored as a bit in the last word in some arrangements in accordance with the invention.

A symbol generator clock 60 in response to a symbol start signal provides clock pulses to a symbol size control circuit 62 responding to the segment size terms $C_1$ and $C_2$ to apply pulses having widths of a selected number of clock pulses or counts of either 2, 4, 8 or 16 through a lead 76 to a 3-bit up counter 80. The clock 60 also applies symbol clock pulses to an up/down X counter 68 and to an up/down Y counter 70. The terms $C_1$, $C_2$ having values 00, 01, 11 and 10 respectively represent pulses developed in the circuit 62 and symbol segments having count lengths 16, 8, 4 and 2. The 3-bit up counter 80 may respond to the falling edges of the pulses, to apply binary count signals through three leads 84 to a 3-bit decoder 86 which responds to the sequential count to develop segment timing pulses $S_0$ through $S_7$. Each of the eight sequential segment commands as defined by a symbol word, is applied to a corresponding one of eight decoding circuits 90 to 97, with each receiving a respective segment pulse $S_0$ to $S_7$ along with the four bits of the segment command such as $M_0$ to $M_3$ and $M_4$ to $M_7$. The decoding circuit 90 is shown in detail including NAND gates 98 to 101 each receiving the segment term $S_0$ and respective symbol bit terms $M_0$ to $M_3$, to respectively generate the terms $\overline{S_0M_0}$, $\overline{S_0M_1}$, $\overline{S_0M_2}$ and $\overline{S_0M_3}$. Thus each logic circuit 90 through 97 is activated in response to a respective segment timing pulse $S_0$ to $S_7$.

The terms $B_0$, $B_1$, $B_2$ and the blanking term $B_3$ are developed by respective NAND gates 108 to 111 operating as OR gates to each received term combined with the segments selection term $S_0$ to $S_7$. The three terms $B_0$, $B_1$, $B_2$ which define the direction of a segment are applied to an increment direction decode circuit 118 which combines the terms to develop the terms X stop, X down, X up which are applied to the up/down X counter 68 and the terms Y stop, Y down, Y up, which are applied to the Y counter 70. The contents of the X counter 68 and the Y counter 70, each of which may include 10 stages, for example, are then applied to respective D/A (digital to analog) converters 122 and 124 and through leads 128 and 130 to respective summing amplifiers 140 and 142. Digital to analog converters 150 and 152 are also provided to respectively respond to the terms $X_0$ to $X_9$ and $Y_0$ to $Y_9$ to develop symbol position signals $X_{pos}$ and $Y_{pos}$ which are applied to respective summing amplifiers 140 and 142. The signals $X_{pos}$ and $Y_{pos}$ developed by respective D/A converters 150 and 152 provide an initial deflection bias to each symbol or initial start point to each individual symbol as it is generated. For providing the display, a tube such as a cathode ray tube 160 has a suitable deflection arrangement 162 which may be deflection plates or a magnetic deflection yoke, for example, responsive in the X and Y dimensions to the respective amplifiers 140 and 142 through leads 170 and 172. Suitable biasing is provided for the various grids of the tube 160 as is well known in the art. The NAND gate 111 applies the blanking signal through a lead 180 and through a control circuit 182 to an intensity grid 184 of the tube 160. The tube 160 has a suitable screen 188 on which the display is produced with the symbol 16 being shown for illustrative purposes.

The various control and timing signals for the display system of the invention are generated in response to the computer last word signal, the request received signal, the data available signal and the data strobe signal provided by the computer 40. The computer memory control receives the word request signal to start the generation of a symbol. A suitable source such as indicated by push button source 190 applies a signal through an OR gate 191 to a start circuit 192 which is a monostable multivibrator for generating a word request pulse which is applied to the computer 40. The OR gate 191 also receives a signal Data Strobe.$D_{xy}$ after a delay in a monostable multibrator 193 and a word complete pulse to respectively generate the first and subsequent word request pulses. For generating the terms $D_{xy}$ and $\overline{D_{xy}}$ to control the strobe operation a computer last word signal and a word complete signal are applied to an assynchronous flip flop 196 which generates a symbol last word term for setting an assynchronous set flip flop 202. The flip flop 196 is reset by a word complete pulse and the flip flop 202 is reset by a data strobe pulse. Also, the flip flop 202 is assynchronously set by a pulse from the push button 190 to provide an initial $D_{xy}$ term. As is well known in the art, assynchronous type flip flops may have a set or a reset assynchronous input that overrides the set and reset inputs. The assynchronous input may be a separate gate coupled to the set or reset terminal and not requiring a clock term. The data strobe signal is applied to the clock and the reset input for resetting the JK flip flop 202 which generates the two terms $D_{xy}$ and $\overline{D_{xy}}$. An AND gate 210 responds to data strobe signal $D_{xy}$ to provide a Data Strobe.$D_{xy}$ term which is applied to the XY register 54 as a strobe pulse and an AND gate 212 receives the data strobe signal and the $\overline{D_{xy}}$ signal to apply a Data Strobe.$\overline{D_{xy}}$ term to the symbol word register 52 as a strobe pulse. A flip flop 214 which may be an assynchronous reset flip flop, is set by the signal Data Strobe.$\overline{D_{xy}}$ while receiving a data strobe signal as a clock signal to generate a symbol start signal which is applied to the symbol generator clock 60. The flip flop 214 is reset by word complete signal which in turn is generated by the term $S_7$ applied to a monostable multivibrator 220.

Figure 5:
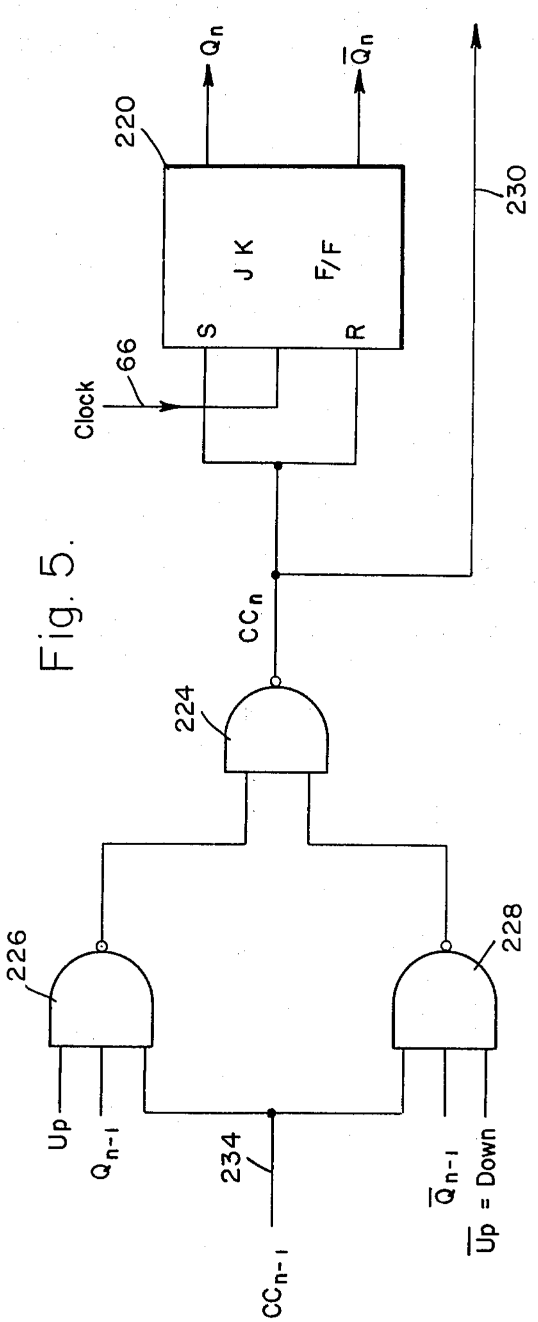
FIG. 5 is a schematic diagram of a typical stage of the up/down counters that may be utilized in the system of FIGS. 4*a*, 4*b* and 4*c;*

Referring now to FIG. 5, each of the counters 68 and 70 of FIGS. 4*a*, 4*b* and 4*c* may include ten stages or any desired number as required for the dynamic range of the system. A typical stage as shown in FIG. 5 is the nth term of the up/down counter where n is the most significant end of the counter. The illustrated system utilizes JK flip flops which, as are well known in the art, change states when both inputs are one, is set to a one state when the set input is true and is set to zero when the R input is true. The $n^{th}$ term of the up/down counter includes a JK flip flop 220 having its clock input coupled by the lead 66 to the clock 60 and its S and R inputs controlled by a NAND gate 224 which develops to term $CC_n$. NAND gates 226 and 228 are respectively responsive to UP, $Q_{n-1}$ and $C_{n-1}$ and to $\overline{UP}$ (or Down), $\overline{Q_{n-1}}$ and $C_{n-1}$. The $CC_n$ term developed by the gate 224 is applied on a lead 230 as the input to the following stage at a lead indicated as 234. The $CC_n$ term equals $UP.Q_{n-1} \,.\, C_{n-1} + Down \,.\, \overline{Q_{n-1}} \,.\, CC_{n-1}$. On the first stage of the counters 68 and 70, CChd 1 equals $B_1 \,.\, \overline{B_2}$ for the X counter and $CC_1$ equals $\overline{B_1}\,\overline{B_2}$ for the Y counter. The clock off or stop term for the X and Y counters is respectively $B_1\,\overline{B_2}$ and $\overline{B_1}\,B_2$. This type of up and down counter is well known in the art and will not be explained in further detail.

Figure 6:
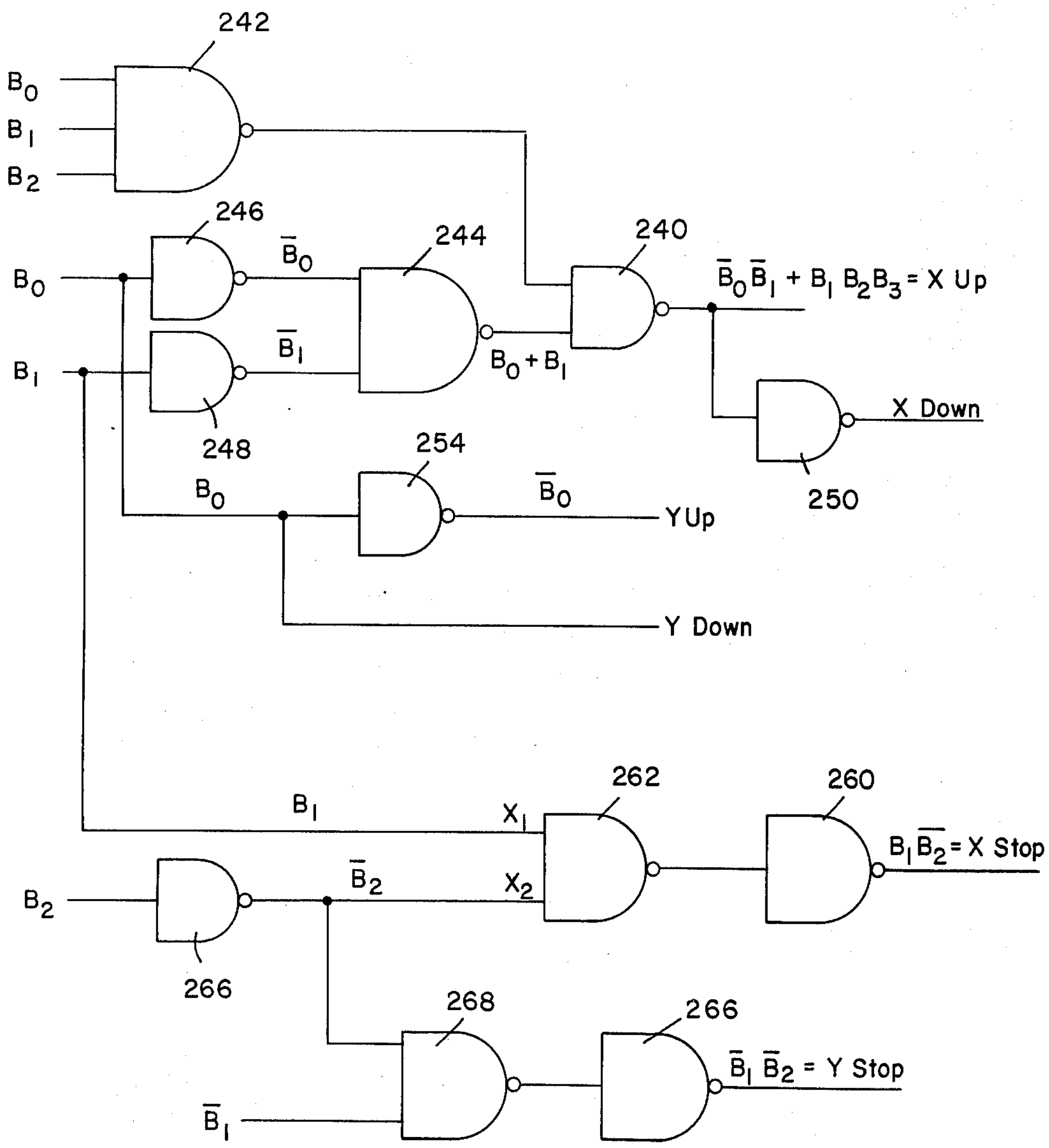
FIG. 6 is a schematic circuit diagram of the increment direction decoder of FIGS. 4*a*, 4*b* and 4*c;*

Referring now to FIG. 6 which shows the increment direction decode circuit 118, the development of the terms utilized in the counters 68 and 70 will be further explained. For generation of the term $X_{up}$ which is equal to $\overline{B_0}\,\overline{B_1}$ + Bhd 1$B_2B_3$, a NAND gate 240 responds to the terms developed by a NAND gate 242 in response to $B_0$, $B_1$ and $B_2$ and to a term $\overline{B_0} + \overline{B_1}$ developed by a NAND gate 244. NAND gates 246 and 248 are respectively responsive to terms $B_0$ and $B_1$ to provide the inputs to the NAND gate 244. The term $X_{down}$ is developed by a NAND gate 250 which provides an inverted form of the term $X_{up}$. The term $Y_{up}$ is developed by a NAND gate 254 responsive to $\overline{B_0}$ which latter term is also the term $Y_{down}$. The term $B_1\,\overline{B_2}$ which is $X_{stop}$ is developed by a NAND gate 260 operating as an inverter and responsive to a NAND gate 262 receiving the terms $B_1$ and $\overline{B_2}$, the latter being provided by a NAND gate 266 operating as an inverter. The term $\overline{B_1}\,\overline{B_2}$ which is $Y_{stop}$ is provided by a NAND gate 266 operating as an inverter in response to the signal provided by a NAND gate 268. The terms $\overline{B_2}$ and $\overline{B_1}$ are applied to the NAND gate 268 which operates as an AND gate.

Figure 7:
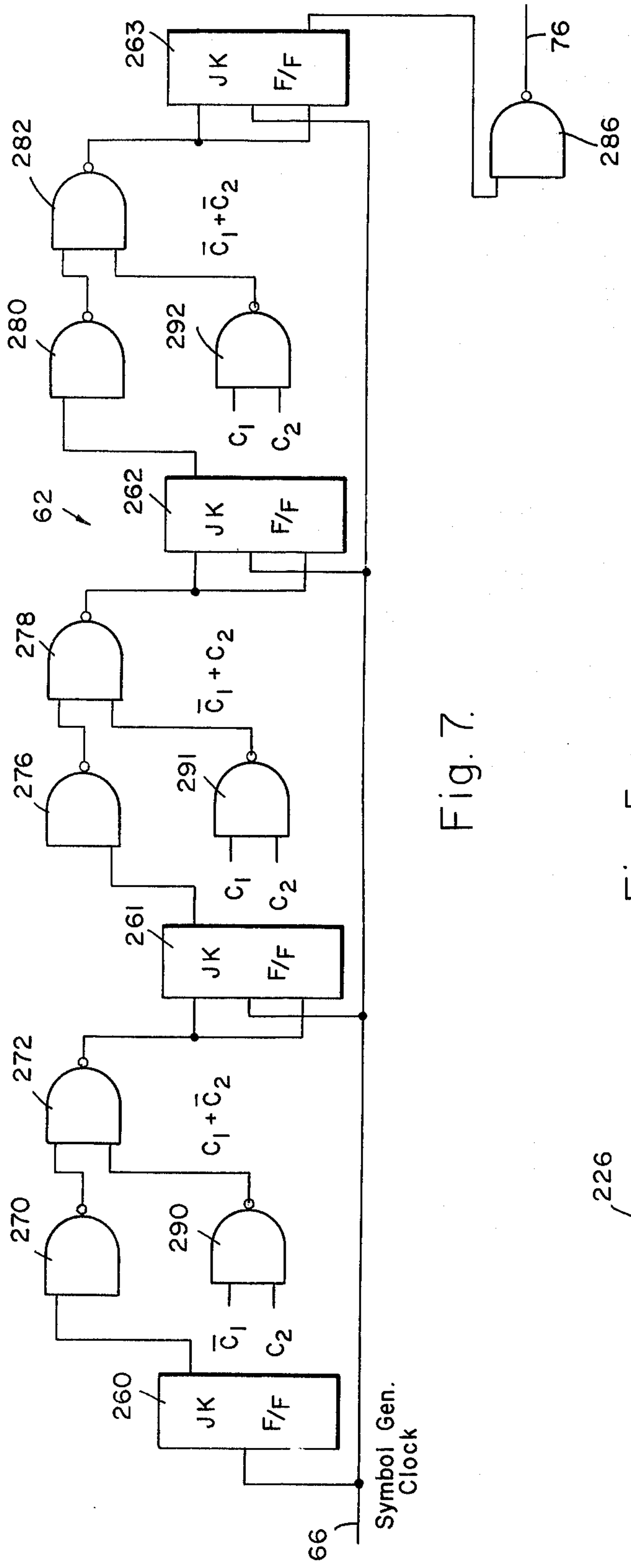
FIG. 7 is a schematic block and circuit diagram of the symbol size control circuit of FIGS. 4*a*, 4*b* and 4*c;*

Referring now to FIG. 7, the symbol size control circuit 62 includes a four stage counter or divider having JK type flip flops 260 to 263 each having a symbol generator clock input from the clock 60. The output of the flip flop 260 having its input terminals held at a high or true value is applied to an inverting gate 270 and in turn to a NAND gate 272. The output of the flip flop 261 is applied to an inverting NAND gate 276 and in turn to the input of a NAND gate 278 which is coupled to both input terminals of a flip flop 262. A true output of the flip flop 262 is applied to a NAND gate 280 operating as an inverter and in turn to a NAND gate 282 which has its output coupled to both of the input terminals of flip flop 263. The output of the flip flop 263 is applied through a NAND gate 286 operating as an inverter to supply pulses of a selected width to the lead 76. Each of the flip flops 260 to 263 operates as a toggle in response to true pulses being applied to their normally false inputs. Thus, the width of a pulse developed by the flip flop 263 is determined by the number of pulses required to change the state of the preceding flip flop 262. NAND gates 290, 291 and 292 are respectively coupled as inputs to NAND gates 272, 278 and 282 to provide the pulse width generation control. The NAND gate 290 receives the term $\overline{C1}$ C2 to develop the term C1 + $\overline{C2}$ which is true for a generation of pulses of eight clock pulses widths. The NAND gate 291 receives the term C1 and $\overline{C2}$ to generate the term $\overline{C1}$ + C2 which is true to provide four clock pulse width pulses for segment control. The NAND gate 282 receives the terms C1 C2 to provide the term $\overline{C}_1 + \overline{C}_2$ which is true to provide a two clock pulse width operation. When the input terms to each gate 290, 291 or 292 are true, a one is applied to the subsequent gate, allowing the counter to ripple or to pass pulses from the previous stage and when the output term of the gates 290, 291 or 292 is false the signals from the previous stage are inhibited from passing therethrough. The following table shows the states for the selectable number of pulses for the NANd gates 290, 291 and 292 which gates when generating false terms, disconnect the input portion of the divider, thus allowing only the flip flops to the right to determine the number of clock pulses defining the segment output pulses. For generation of segment pulses having a width of sixteen clock pulses, each of the gates 290, 291 and 292 has a normal one or true output so that the entire divider arrangement of four flip flops is operative.

TABLE II

| Number of Clocks Per Pulse | $C_1$ | $C_2$ | $C_1+\overline{C}_2$ | $\overline{C}_1+C_2$ | $\overline{C}_1+\overline{C}_2$ |
|---|---|---|---|---|---|
| 16 | 0 | 0 | 1 | 1 | 1 |
| 8 | 0 | 1 | 0 | 1 | 1 |
| 4 | 1 | 0 | 1 | 0 | 1 |
| 2 | 1 | 1 | 1 | 1 | 0 |

The circuit of FIG. 7 operates to generate pulses either 2, 4, 8 or 16 clock periods in width respectively representing increasing larger segment and symbol sizes.

Figure 8A:
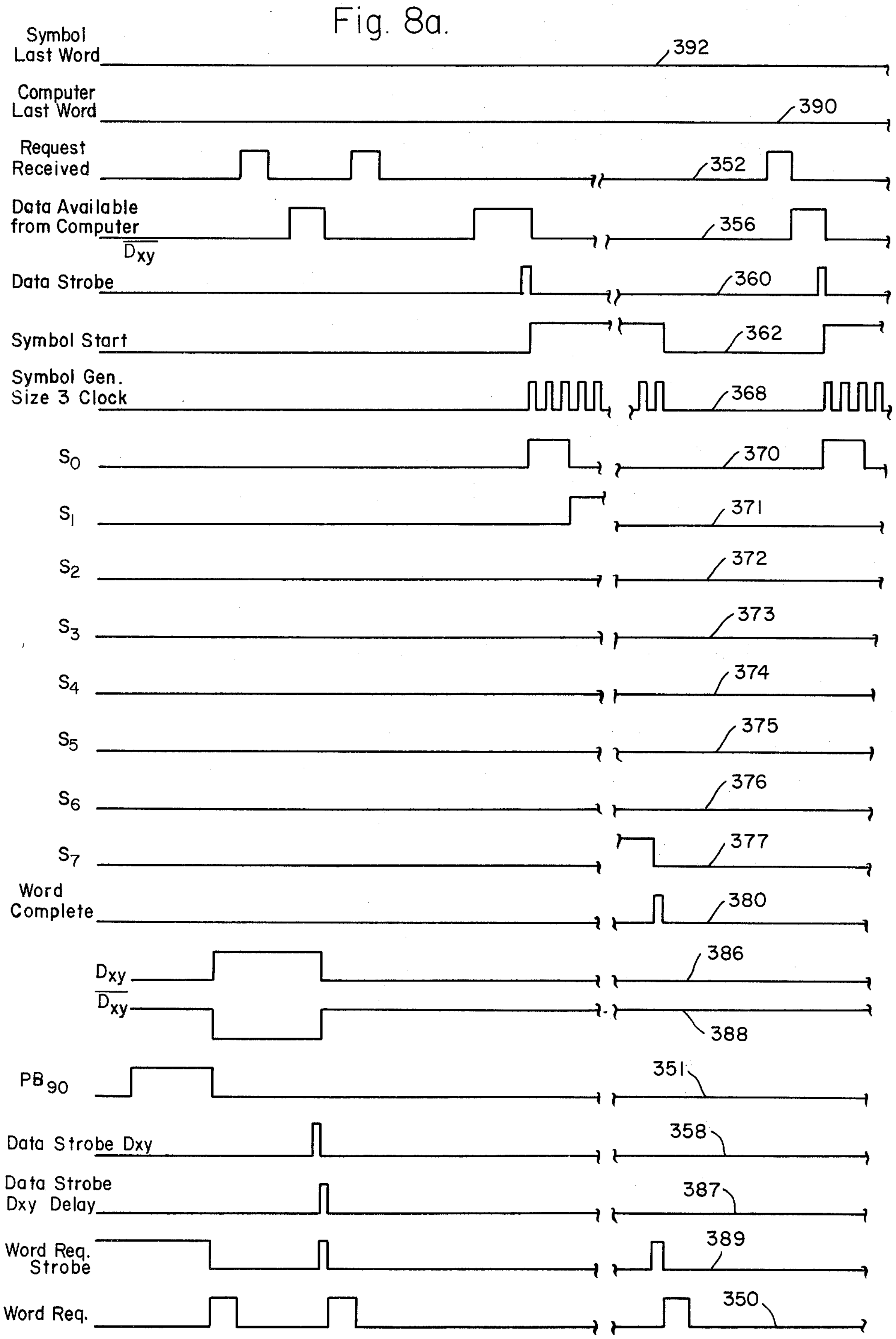
FIGS. 8A and 8B are schematic diagrams of waveforms of voltage as a function of time for explaining the operation of the system of FIGS. 4*a*, 4*b* and 4*c;*
Figure 8B:
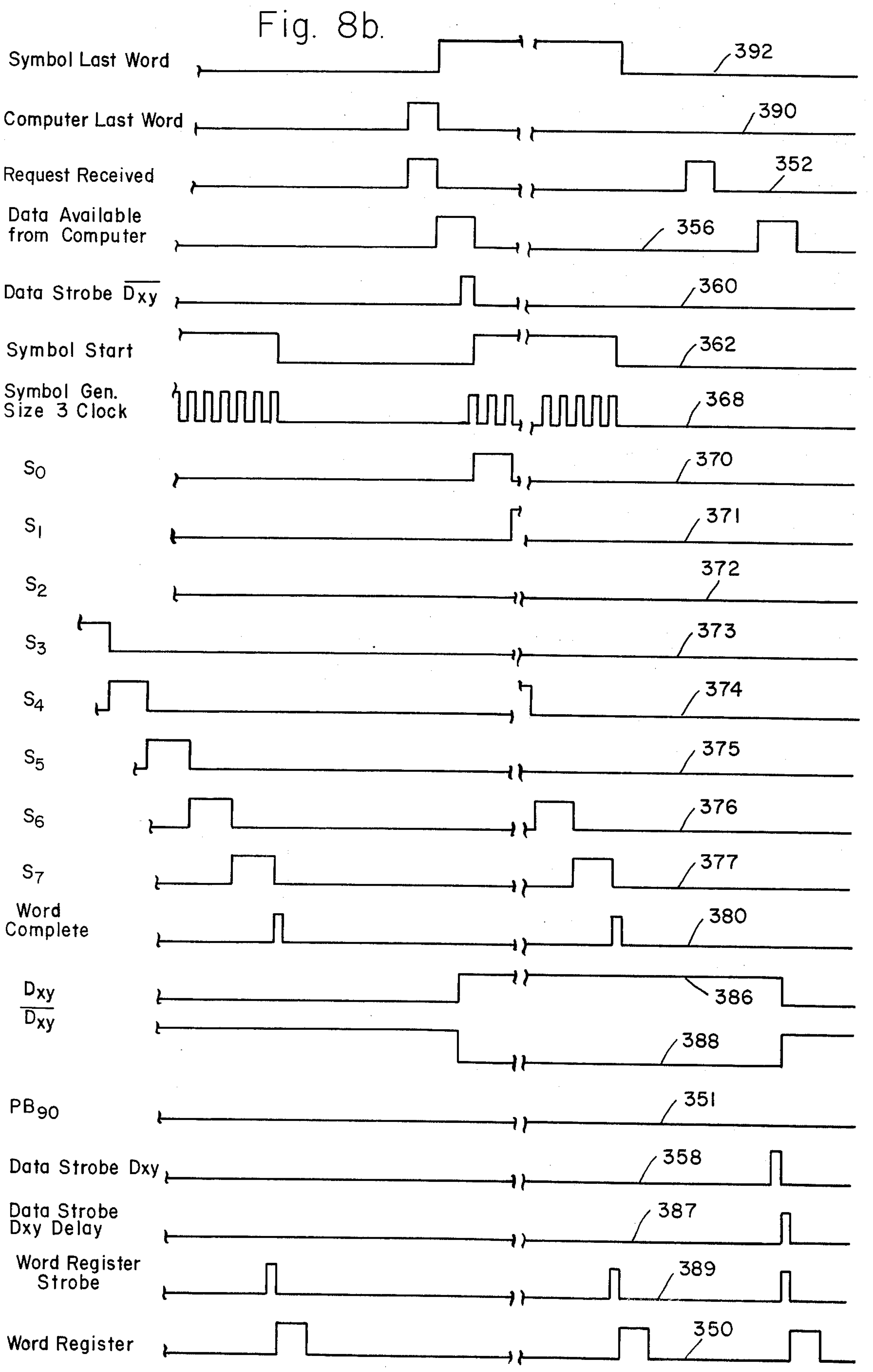

Referring now to FIGS. 8A and 8B as well as to FIGS. 4*a*, 4*b* and 4*c*, the operation of the symbol generator will be explained in further detail. A symbol generator word request signal of a waveform 350 is generated by the monostable multivibrator in response to the push button signal of a waveform 351 and transferred to the computer which responds with a request received signal of a waveform 352. Also the data available pulse from a waveform 356 is provided by the computer. A data strobe into XY register pulse of a waveform 358 which is the term Data Strobe.$D_{xy}$ generated by the gate 210, is applied to XY word register 54 to gate the XY word therein from the read register 44 or from a suitable input-output unit. A data strobe in the symbol register pulse of a waveform 360 is generated by the gate 212 as the term Data Strobe.$D_{xy}$ and a symbol start pulse of a waveform 362 is provided by the flip flop 214. The symbol start pulse of the waveform 362 is applied to the symbol generator clock 60 for initiating the symbol generator clock pulses of a waveform 368 which are shown for a short segment or size 3 condition when $C_1C_2 = 11$. The 3-bit decoder 86 then generates segment pulses $S_0$ to $S_7$ of the respective waveforms 373 to 377 until a word complete pulse of the waveform 380 is generated by the monostable multivibrator 220. The terms $D_{xy}$ and $\overline{D_{xy}}$ as generated by the flip flop 202 are shown by respective waveforms 386 and 388.

The Data Strobe.$D_{xy}$ delay pulse as provided by the circuit 193 is shown by a waveform 387 and the word request strobe pulse at the output of the OR gate 191 is shown by a waveform 389. This operation occurs during each symbol word until the last word occurs, at which time the computer provides a computer last word pulse of a waveform 390 which in turn generates the symbol last word pulse of a waveform 392. The symbol generator last word term causes the term $D_{xy}$ of the waveform 386 to be true so that the Data Strobe.$D_{xy}$ pulse generates a word request and strobes a new X-Y word into the register 54 at the end of the last symbol word operation. This operation continues in a similar manner for each sequential symbol that is to be displayed.

Figure 9:
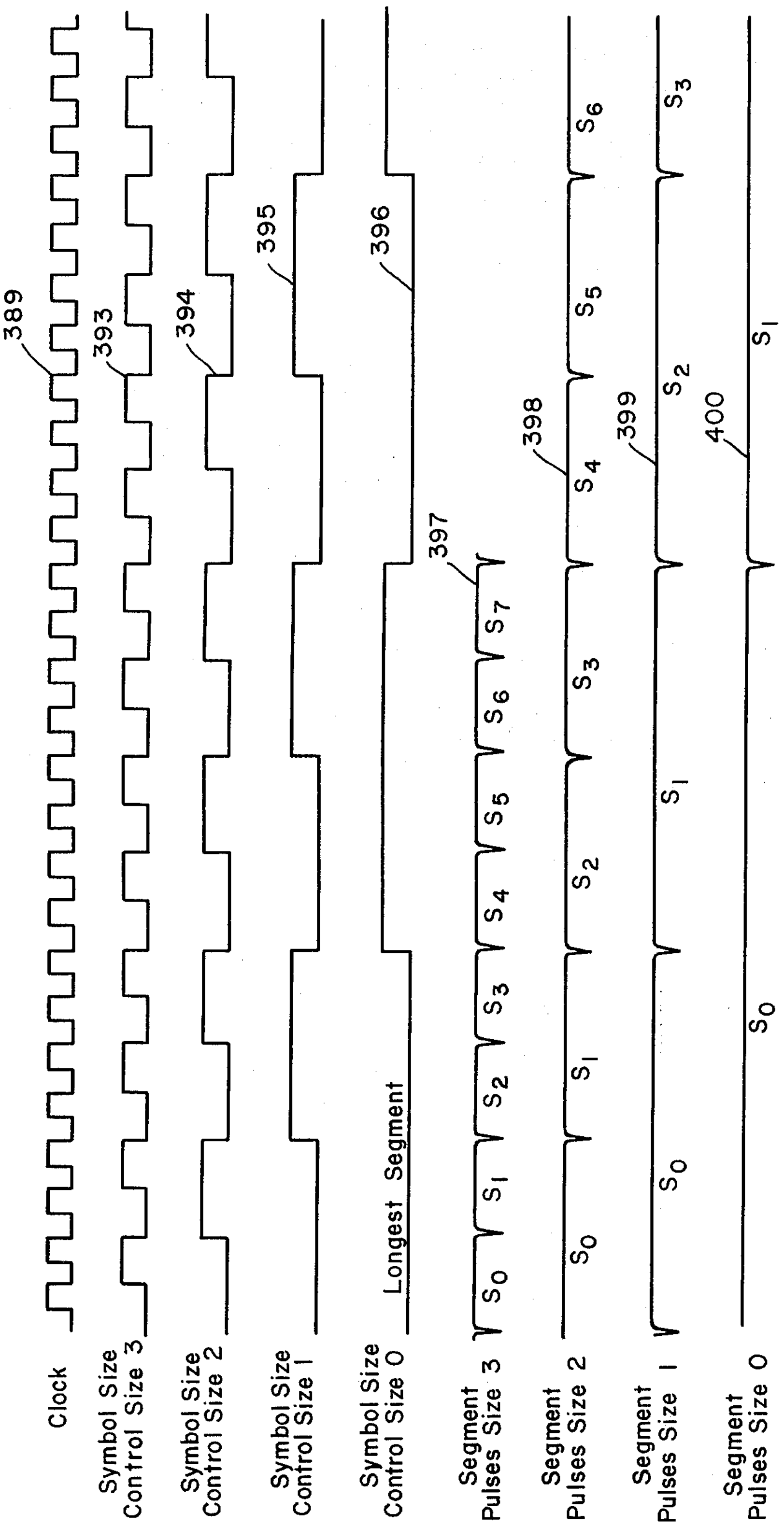
FIG. 9 is a schematic diagram of waveforms of voltage as a function of time for explaining the operation of the symbol size control circuit and the development of the segment pulses of FIGS. 4*a*, 4*b* and 4*c.

Referring now to FIG. 9 as well as to FIGS. 4*a*, 4*b*, 4*c* and 7, the clock pulses from the symbol generator 60 are shown by a waveform 389. The timing pulses developed by the symbol size control circuit 62 in response to the clock 60 are shown by waveforms 393 to 396 for respective symbol sizes 3, 2, 1 and 0 having widths of 2, 4, 8 and 16 clock pulses. During each pulse interval a line segment is drawn of the corresponding length. Waveforms 397 to 400 show the segment pulses that are developed by the 3-bit decoder 86 in response to the pulses of respective waveforms 393 to 396. It is to be noted that the clock of the waveform 389 is terminated at the fall of the pulse $S_7$ after 8 pulses are developed for each selected size and is only started when another symbol code is received and stored in the register 52.

Figure 10:
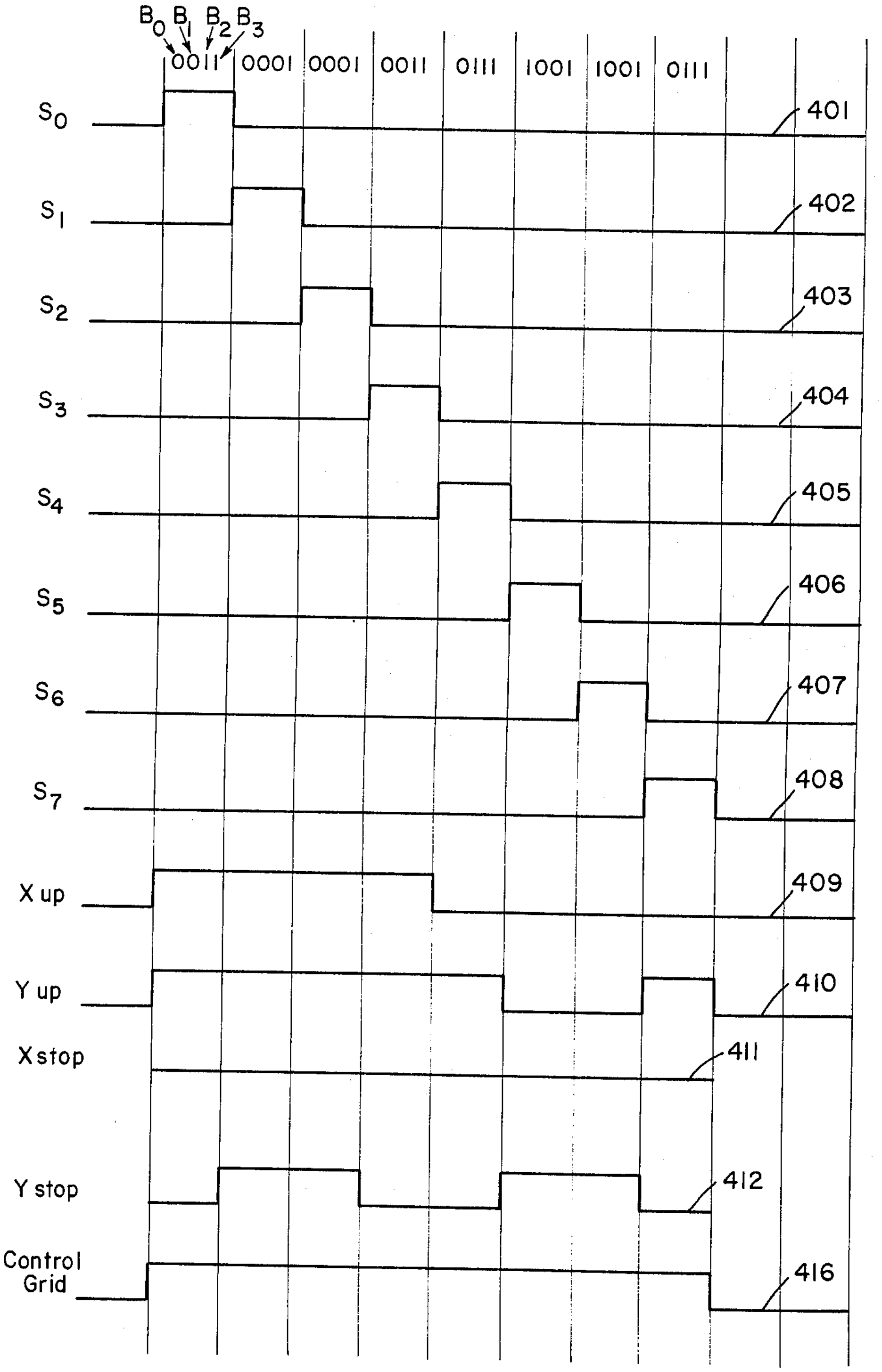
* and FIG. 10 is a schematic diagram of waveforms of voltage as a function of time for further explaining the operation of the up and down counters in the system of the invention.

Referring now to the waveforms of FIG. 10, the operation of the up/down counters of FIGS. 4*a*, 4*b* and 4*c* will be further explained. The first eight segments for drawing the illustrated symbol of FIG. 2 are shown at the top of the figure defining the line segments represented by segment pulses $S_0$ to $S_7$ respectively of waveforms 401 to 408. The direction determination of the counters 68 and 70 are determined by $X_{up}$, $Y_{up}$, $X_{stop}$ and $Y_{stop}$ of respective waveforms 409, 410, 411 and 412. In response to segment command code 0011 $X_{up}$ and $Y_{up}$ are true and $X_{stop}$ and $Y_{stop}$ are false. In response to the 0001 code during the $s_1$ segment pulse and during the $S_2$ segment pulse $X_{up}$, $Y_{up}$ and $Y_{stop}$ are all true, the stop terms overriding the up terms or the down terms, the latter of which are the complement of the up terms. During segment pulse $S_4$ the signal from the waveform 409 provides an $\overline{X_{up}}$ or $X_{down}$ term (X direction is to the left in FIG. 1) and the signals from the waveforms 410 and 412 provide a $Y_{up}$ term and a low $Y_{stop}$ term. During the segment $S_6$ the $Y_{stop}$ pulse of the waveform 412 is true and the $X_{up}$ signal of waveform 409 is false so the X counter counts down. During the segment period $S_7$, the $Y_{up}$ term of waveform 410 is true, the $Y_{stop}$ term of the waveform 412 is false and the $Y_{stop}$ term of the waveform 412 is false and the $Y_{stop}$ counter counts up. At the same time, the $X_{up}$ term is false so that the X counter counts down to determine the direction of that increment. A control grid pulse of a waveform 416 remains high during the segment periods $S_0$ to $S_7$ indicating that blanking in response to the bit $B_3$ is not required during the first portion of the symbol, and this pulse may either remain true except when blanked or may be, for example, controlled by segment $S_0$ pulse of waveform 401 and a termination of the $S_7$ pulse of the waveform 408 or by other suitable control arrangements as are well known in the art.

Thus there has been described direction coded digital stroke generator that requires a minimum of logic because its direction is defined by 3 bits and its utilizes the initial position derived from drawing a previous line segment. The direction coded digital stroke generator combines the flexibility of dot symbol generators with the speed and efficiency of prior stroke generators. In operation each line segment is defined by four bits with three to define direction and one to determine blanking. The three direction bits are decoded to control X and Y up/down counters orienting the segments in one of eight directions. The symbol generator in accordance with the invention is particularly suited for relatively complex and variable symbology that is required such as, for example, pictures or maps of terrain or other areas. The system may utilize a dynamic memory which may obtain commands in real time directly from a computer or other suitable source. By utilizing short segments any type curve may be drawn with a high degree of accuracy. In order to provide flexibility of symbol size and detail, the generator of the invention includes a symbol size control arrangement that allows selection of line segment lengths.

What is claimed is:

1. A symbol generating system comprising:

display means including X and Y deflecting means;

X and Y up and down counters coupled to said X and Y deflecting means to develop a plurality of line segments;

a source of direction commands for each segment for selectively controlling each of said X and Y counters to count up, count down or to stop;

decoding means coupled to said X and Y counters and responsive to said source of direction commands to develop X and Y count up, count down and stop signals to control said respective X and Y counters so that said plurality of line segments after a first segment each start at the termination of the previous segment;

a source of clock signals for providing clock signals of a fixed frequency coupled to said X and Y up and down counters;

a source of segment length commands; and segment length control means responsive to said source of segment length commands including frequency divider means coupled between said source of clock signals and said decoding means to control the time of passing of the direction commands for each segment by said decoding means to said X and Y up and down counters to determine the length of said line segments.

2. The combination of claim 1 in which the segment length control means includes counting means to provide segment pulses to said decoding means having selected durations.

* * * * *